Sept. 28, 1965     C. O. SCHELIN     3,208,218
GAS TURBINE SPEED REGULATOR
Filed Sept. 25, 1963     2 Sheets-Sheet 1

INVENTOR
Carl O. Schelin
By Wolfe, Hubbard, Voit & Osann
ATTORNEY

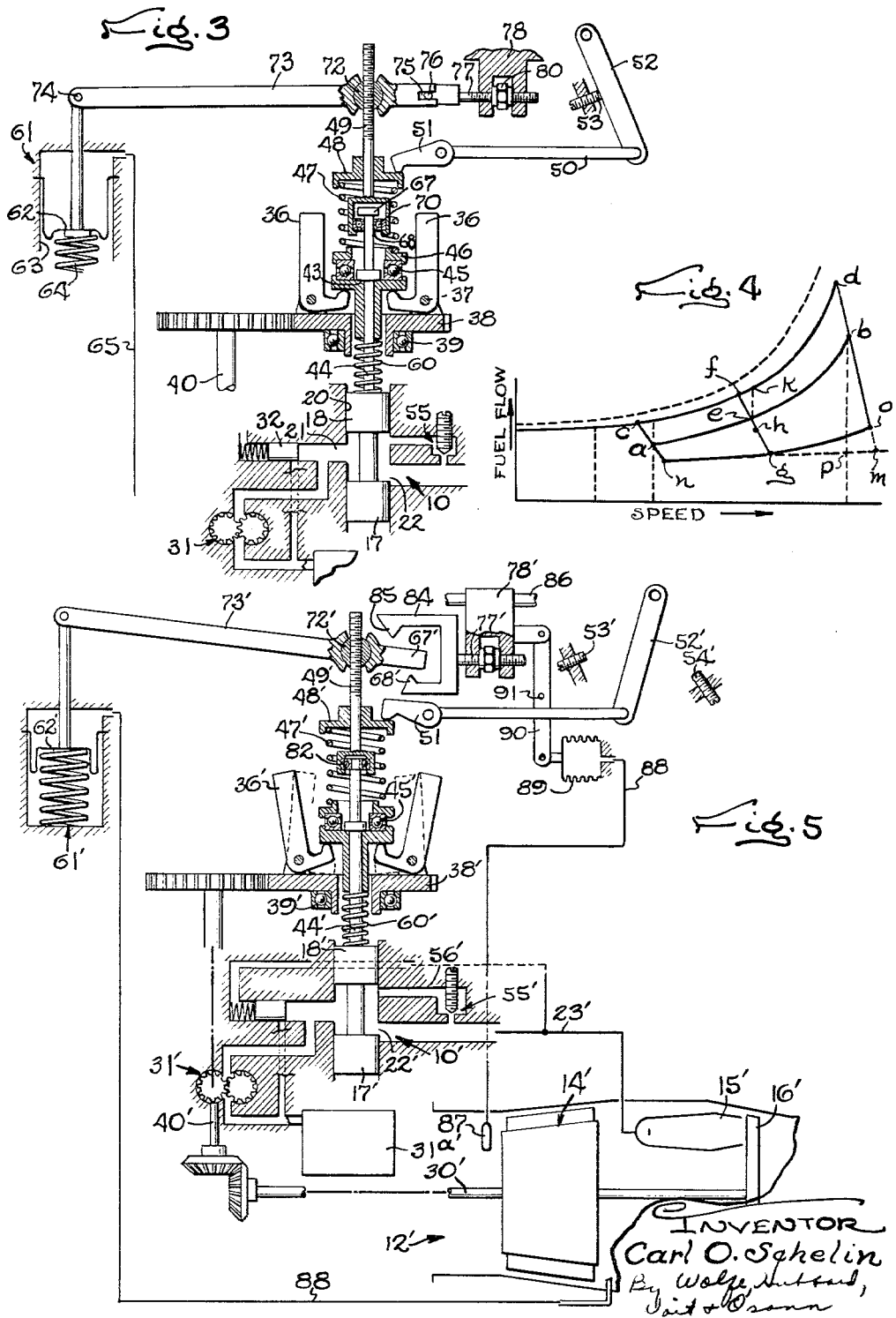

United States Patent Office 3,208,218
Patented Sept. 28, 1965

3,208,218
GAS TURBINE SPEED REGULATOR
Carl O. Schelin, Rockford, Ill., assignor to Woodward Governor Company, Rockford, Ill., a corporation of Illinois
Filed Sept. 25, 1963, Ser. No. 311,525
5 Claims. (Cl. 60—39.28)

This invention relates to a governor operable at different manually selectable speed settings to regulate the fuel supply to a gas turbine and therefore the steady state operation of the latter and incorporating means responsive to one or more parameters and operating during acceleration of the turbine to limit the fuel flow in accordance with a preselected maximum fuel schedule that will avoid overheating of the turbine. The invention has more particular reference to such controls in which the maximum limit schedule is determined by changing the position of a mechanical stop primarily with changes in compressor discharge pressure which has been found to be a fairly accurate measure of the air flow to the turbine burners.

The general object is to provide a combined speed and miximum fuel limit control of the above character which, as compared to prior similar controls, is considerably simpler and less expensive in construction and better adapted to maintain a desired limit schedule under the varying operating conditions enocountered in service use.

Another object is to incorporate in a combined speed governor and fuel limiter of the above character a novel means for preventing the full force centrifugally developed by the governor from opposing the pressure sensor while the latter is in exclusive control of the fuel valve.

A further object is to transmit the pressure signal to the limit stop through a simple lever whose ratio may be adjusted conveniently to vary the acceleration schedule or adjust the same for fuels of different densities.

Still another object is to utilize the acceleration limiting mechanism to also control the rate of deceleration of the prime mover.

Other objects and advantages of the invention will become apparent from the following detailed description taken in connection with the accompanying drawings, in which FIGURE 1 is a schematic view and circuit diagram of an acceleration limited prime mover control embodying the novel features of the present invention.

FIGS. 2 and 3 are parts of FIG. 1 showing different positions of the parts.

FIG. 4 is a fuel flow vs. speed curve.

FIG. 5 is a view similar to FIG. 1 showing a modified form of the invention.

The invention is shown for purposes of illustration incorporated in a droop type governor for maintaining substantially constant speed operation of a gas turbine 11 by variably positioning a valve 10 which regulates the flow of fuel to the turbine burners. Air entering the inlet 12 of an elongated casing 13 passes successively through the rotor of a compressor 14, a combustion chamber 15 and the blades of a turbine 16 before being discharged from the outlet of the casing.

Herein, the fuel valve 10 comprises spaced lands 17 and 18 slidable in a bore 20 communicating with a fuel supply passage 21 and having an outlet port 22 communicating with a fuel supply passage 21 and having an outlet port 22 communicating through a pipe 23 with the burner nozzles 24 and variable in area according to the axial position of the land 17. The valve and the parts governing its operation are designed to fit compactly within a fluid filled casing 29 indicated by the hatching on the drawings and attached to the exterior of the turbine whose shaft 30 is extended in the casing through suitable gearing and to a shaft 40. The latter is coupled to a main pump 31 which draws fuel from a source 31ª and delivers the same at the desired high pressure to the passage 21 and the valve 10.

To provide the usual constant pressure drop across the fuel valve 10, the supply pressure and the burner pressure are exerted on opposite ends of a piston 32 loaded by a spring 33 and slidable in a cylinder 34 and cooperating with a port 35 therein to form a valve for by-passing fuel out of the supply line 21 and to the pump inlet.

The arrows applied to the drawings indicate in each instance the direction of an increase of motion or a parameter.

In the present speed governor, the sensor for detecting variations in the speed of the gas turbine is of the flyball type including upstanding L-shaped weights 36 fulcrumed at 37 on a ball-head 38 journaled in a bearing 39 in the casing 29 and driven from the shaft 40. For an important purpose to appear later, the toes 41 on the short arms of the flyweights bear upwardly against a flange 42 formed on the upper end of a sleeve 42ª loose on the extended upper end portion of the stem 44 of the fuel valve and normally abutting as shown in FIG. 1 at its upper end against a shoulder 43 rigid with the stem.

Seated on the flange 42 is the lower race ring of an anti-friction bearing 45 whose upper race carries a ring 46 forming an abutment for the lower end of a helically coiled speeder spring 47 of the compression type. The upper end of the spring abuts against and is seated in a disk 48 slidable along and guided on a rod 49 which extends axially through the spring and well beyond the upper end thereof. Adjustment of the spring stress to vary the speed setting of the governor is effected by rocking of a shaft 50 journaled in the casing 29 and having fast thereon a short arm 51 bearing against the top of the disk 48. The shaft extends outwardly through a wall of the casing and carries an arm 52 swingable through a range determined by adjustable stops 53, 54 which determine the maximum speed and shut-down settings of the governor. When the arm 52 is in the shut-down position, fuel flows to the turbine at a minimum rate determined by the adjustment of a valve 55 in a by-passage 56 around the valve.

It will be apparent that the speeder spring force urges the bearings 45 and the flange 42 downwardly against the toes 41 so that the centrifugal force developed is balanced against the spring at the prevailing speed of operation of the turbine. Normally or during such steady state operation, the flange 42 abuts the shoulder 43 so that the valve stem moves up and down with changes in the turbine speed and always takes a position corresponding to the radial positions of the flyweights, the fuel valve being opened correspondingly. The turbine speed at which such equilibrium is established may, of course, be varied by adjustment of the throttle lever 52 and therefore the force exerted on the flyweights by the speeder spring.

The present invention contemplates disabling the speed governor automatically in response to a wide increase in the speed setting of the throttle 52 and the speeder spring and transferring the control of the fuel valve to mechanism about to be described for scheduling the increase in fuel supply during the resulting acceleration period. Such disabling is achieved by normally connecting the flyweights to the valve stem through abutment on the shoulder 43 and the flange 42 which separate from each other when the limiting mechanism comes into play. To this end, the sleeve 42ª is slidable along the stem and is urged continuously toward the shoulder by a light spring 60 coiled around the stem and compressed between the sleeve and the upper end of the land 18. This spring is stressed to produce a biasing force which is small, for example three pounds, as compared to the force, for example, four to sixteen pounds, exerted by the speeder spring. As a result of the yieldable connection thus formed, the flyweights may be disconnected from the valve stem thus removing from the latter the centrifugal force developed while the limit mechanism is in control.

In the present instance, the fuel supply during acceleration is scheduled to correspond to the increase in the compressor discharge pressure following a wide increase in the speed setting of the throttle. Herein, the pressure sensor, indicated at 61, comprises a piston 62 sealed in and slidable along a cylinder 63 urged by a compression spring 64 in the open end of the cylinder in the pressure decreasing direction. The opposite open end communicates through a passage 65 exposed to the air in the turbine casing at the discharge end of the compressor 14. The piston is moved upwardly and downwardly following the decreases and increases in the compressor discharge pressure, being disposed in the position shown in FIG. 1 when the turbine is operating steady state.

The rod of the piston 62 projects slidably through the end of the cylinder and its motion may be transmitted to the valve stem 44 through two opposed stop members which are spaced apart during steady state operation but come into abutment in response to a wide increase in the speed setting of the throttle 52. In the form shown in FIG. 1, one of these stop members is a flange 67 on the upper end of the valve stem providing a downwardly facing abutment for engagement with the inner race ring 68 of a ball-bearing 70 which forms the other stop and is supported on the depending legs of a yoke 71 on the lower end of the rod 49 above described. For the sake of compactness, the stops are disposed within the speeder spring 47.

At its upper end, the rod 49 threads through a pivot 72 journaled in and extending transversely through an elongated substantially straight and horizontally disposed lever 73 whose longer end portion is pivotally connected at 74 to the rod of the piston 62. A slot 75 in the shorter end portion of the lever straddles a cross-pin 76 on the end of a screw 77 horizontally slidable in a block 78 by turning a nut 80 disposed between upstanding lugs on the block. The position of the fulcrum pin 76 along the slot may thus be adjusted to vary the lever ratio and therefore maintained fuel schedule. The control is thus readily adaptable for use with fuels of different gravities.

During steady state operation at any selected speed, the stop 68 is disposed a short distance below the stop flange 67 as shown in FIG. 1. Then, when the throttle lever is swung counterclockwise to effect a substantial increase in the speed setting, the motion of the arm 51 is transmitted through the speeder spring 47 to the flyballs thus swinging the latter inwardly and effecting a lowering of the sleeve 42ª which is transmitted to the valve stem through the light spring 60. Such opening of the valve 10 is limited by engagement of the stem flange 67 with the stop 68 whose position is fixed by the prevailing value of the compressor discharge pressure. The latter thus determines the initial rate of fuel flow during a period of acceleration.

By yielding of the speeder spring and also the spring 60, the downward movement of the abutment 48 by the throttle lever will normally be continued beyond the point of engagement of the stops 67 and 68 so as to permit the throttle to be disposed at the speed setting desired. In such movement, the sleeve 42ª is slid down along the valve stem and away from the shoulder 43 until the toes of the flyweights come against the top of the ball-head 38 as shown in FIG. 2. At this time, only the small force of the spring 60 is exerted on the stops and the limit controlling linkage in opposition to the force developed by the pressure sensor 61. Therefore, the substantial and variable centrifugal force developed by the flyweights during the acceleration period is not exerted on the linkage and, as a consequence, the fuel flow is scheduled more accurately in accordance with the changes in the compressor discharge pressure.

Operation

Let it be assumed that the structure above described is constructed and arranged to produce the fuel flows at different engine speeds as represented by the line $ab$ (FIG. 4) during steady state operation, that is, when the fuel valve is under the control of the flyweights alone. During acceleration while the valve is under the control of the pressure sensor alone, the fuel flow is scheduled as represented by the curve $cd$ which is spaced above the curve $ab$ a distance determined by the spacing of the stops 67 and 68 during steady state operation, this spacing of the stops being proportional to flow difference between the steady state and acceleration limit fuel at any given speed.

Steady state operation

The parts will be positioned as shown in FIG. 1 when the turbine is running steady state at a speed $e$ somewhat above the idle speed $a$. The sleeve flange 42 is in abutment with shoulder 43, and the opening of the fuel valve 10 is determined by the radial positions of the flyweights which in turn correspond to the prevailing setting of the throttle arm 52 and the compression of the speeder spring 47. In response to a decrease in the load on the turbine, the flyweights swing outwardly thus raising the sleeve 42ª, the shoulder 43 and the stem 44 to close the valve and cut down the fuel supply along a droop line $fg$ an amount corresponding precisely to the speed decrease. Since the governor is of the droop type, the flyweights and the valve remain in the new position and the turbine operates at the newly sensed speed, for example, $h$.

In a similar way, the flyweights swing inwardly in response to a decrease in the turbine speed. With the spring 60 urging the valve steam downwardly thus holding the shoulder 43 against the flange 42, the fuel valve 10 is opened thus increasing the fuel flow until the speed decrease has been interrupted at the value determined by the droop of the governor.

Operation during acceleration

If during such steady state operation, the throttle lever is swung counterclockwise, for example to the maximum speed setting against the stop 53, the parts will be positioned as shown in FIG. 2. In the initial portion of the change in throttle position, the shoulder 43 is maintained in abutment with the sleeve 42ª under the action of the spring 60 which moves the land 18 and steam 44 downwardly. Such opening of the fuel valve continues until the stop 67 comes into abutment with the stop as shown in FIG. 2.

As the throttle speed increasing adjustment is continued beyond the point of engagement of the stops 67 and 68, the flyweights swing further inwardly and the sleeve flange 42 moves on below the shoulder 43. Such separation continues until the toes of the flyweights are stopped by engagement with the top of the ball-head as shown in FIG. 2. Following such stopping of the flyweights, the final adjustment of the throttle to the new setting is permitted by compression of the speeder spring 47.

As a result of the increase in the speed setting of the throttle, the fuel flow is increased to $k$ on the curve $cd$, this being the maximum permissible flow determined by the compressor discharge pressure at the then prevailing speed. With the ensuing speed increase, the piston 62 moves downwardly thus rocking the lever 73 counterclockwise to lower the stop 68 and therefore the valve stem, the stops 67 and 68 being maintained in engagement under the force of the light spring 60. The opening of the fuel valve continues upwardly along the curve $cd$ under the sole control of the pressure sensor, the force developed at this time by the flyweights being of no effect by virtue of the above described separation of the flange 42 and the flyweight toes from the stop 43 and the valve stem.

During the continued acceleration of the turbine, the compressor discharge pressure increases progressively thus rocking the lever 73 counterclockwise to lower the stem 44 and increase the fuel valve opening correspondingly. The resulting increase in turbine speed increases the centrifugal force developed by the flyweights which force eventually overcomes the stress of the speeder spring and initiates raising of the toes above the ball-head. This action continues until the maximum speed $d$ has been attained, the sleeve 42ᵃ and its flange 42 having again been brought into abutment with the shoulder 43 on the valve stem at which time the connection between the flyweights and the valve stem is reestablished thus transferring the control of the fuel supply back to the speed sensor. The parts are then positioned as shown in FIG. 3. Since the fuel flow at this time is substantially greater than that required for steady state operation at the selected maximum speed, the turbine continues to accelerate so that the resulting speed increase causes the flyweights to swing outwardly thus raising the valve stem to reduce the fuel flow along the droop line $db$ until the force of the speeder spring at the maximum speed setting of the throttle becomes balanced by the flyweight force at the point $b$ on the steady state curve.

When it is desired to reduce the turbine speed to a substantially lower value, for example point $a$, the throttle lever is swung to a position corresponding to such value. This reduces the stress in the speeder spring and allows the flyweight force to raise the valve stem and close the valve 10 thereby reducing the fuel supply to a value determined by the restriction 55. The turbine decelerates rapidly down along the line $pn$ whereupon the control of the valve 10 by the flyweights is restored, the fuel then being increased along the droop line $cn$ to the steady value $a$.

If it is desired to shut down the turbine, the throttle is swung against the shut-down stop 52, thus overtraveling the idle speed setting. Such overtravel permits the throttle lever to be used for actuating a suitable and conventional turbine shut-down device.

*Modified Form*

The stops which provide the normal lost motion in the connection between the pressure sensor and fuel valve and control the transfer of the fuel supply back and forth between the speed sensor and the acceleration limiter may be disposed in other positions in the maximum fuel limit control linkage. A modification of this character is shown in FIG. 5 in which the parts performing the function of those above described are indicated by the same but primed reference numerals. In this instance, the rod 49' supporting the pivot 72' of the lever 73' is connected directly to the valve stem 44' through an anti-friction bearing 82 while the fulcrum of the lever is formed by the stop 68' which comprises an edge on a yoke 84 carried by the screw 77' and adjustable along the short end 67' of the lever to vary the motion-transmitting ratio thereof. The lever end 67' thus constitutes a stop movable back and forth with the valve stem.

The operation of this modified control is essentially the same as above described, the stops 67' and 68' being spaced apart as shown in FIG. 4 during steady state operation of the turbine. In response to counterclockwise swinging of the throttle to effect a substantial increase in the speed setting, the spring abutment 48' is lowered, the flyweights are swung inwardly to the positions shown in phantom, the fuel valve is opened correspondingly, and the speeder spring is compressed to a value corresponding to the new speed desired. As before, the lost motion between the stops 67' and 68' is taken up and the stops come into abutment at the maximum flow rate $k$ (FIG. 4) permissible at the prevailing compressor discharge pressure.

With the fuel flow thus increased but limited, the turbine accelerates and the fuel flow increases along the curve $cd$ until, by approach of the turbine speed to the newly selected value, the engine speed has increased enough to allow the flyweights to swing the lever 73' away from the stop 68'. Control of the fuel valve is thus transferred back to the flyweights which then continue to control the positioning of the fuel valve to effect normal steady state operation.

In certain gas turbines, it is desirable to limit the fuel supply according to a predetermined schedule during deceleration as well as during acceleration. To accomplish this with the modified control, it is only necessary to provide an additional stop 85 opposing the acceleration stop 68' and spaced from the latter a distance sufficient to remain out of abutment with the short end 67' of the lever during normal steady state operation but to become effective in response to a substantial decrease in the speed setting. Preferably, the deceleration stop is mounted on the block 84 for adjustment therewith by the screw 77'. It is spaced closer to the pivot 72' than the acceleration stop so as to increase the ratio of the lever 73' as moved by the pressure sensor. The deceleration limit curve $no$ (FIG. 4) is thus made somewhat flatter than the curve $cd$ as is permissible and desirable in most modern gas turbines.

With the acceleration stop 68' forming the fulcrum of the lever 73' (FIG. 5), it is easy to modify the acceleration fuel schedule (curve $cd$) in accordance with one or more the parameters which may affect the operation of certain gas turbines. For this purpose, the block 78' is mounted in a suitable guide 86 for sliding adjustment longitudinally of the lever 73' and coupled to a sensor for movement back and forth with changes in a parameter such as the temperature of the air entering the compressor inlet 12'. Thus, the sensor may take the form of a bulb 87 disposed in the inlet and communicating through a capillary tube 88 with a bellows 89 fixed at one end and coupled at its movable end with one end of a lever 90 fulcrumed at 91 intermediate its ends and pivotally connected at its other end to the block 78'. The bulb and bellows are filled with liquid which expands and contracts as the temperature of the bellows increases and decreases thus causing corresponding adjustment in the position of the acceleration stop and lever fulcrum 68'. With this arrangement, an increased inlet temperature to a given value will result in retraction of the stop 68', a decrease in the effective ratio of the lever 73', and shifting of the maximum fuel limit curve as indicated in phantom in FIG. 4.

I claim as my invention:

1. For regulating the flow of fuel to a gas turbine, the combination of, a ball-head rotatable with the turbine shaft, a valve having a stem slidable relative to said ball-head back and forth along the axis thereof to increase and decrease the fuel flow, a shoulder on said stem facing in the direction of the fuel-increasing movement thereof, a sleeve slidable along said stem into and out of abutment with said shoulder, a flyweight fulcrumed on said ball-head and abutting said sleeve to move said stem in the fuel-decreasing direction with increases in the turbine speed, a speeder spring urging said sleeve in the fuel decreasing direction normally balancing the forces of said flyweight, a second spring exerting a force substantially less than said speeder spring and acting between said stem and said sleeve to urge the latter toward abutment with said shoulder, manually operable means for adjusting the stressing of said speeder spring whereby to vary the setting of the all-speed governor formed by said valve, said ball-head and flyweight and the speeder spring and thereby position said stem in accordance with the radial position of said flyweight, means for sensing changes in the compressor discharge pressure in said turbine including an element movable back and forth with increases and decreases in such pressure, opposed stop members spaced apart during steady state operation of the turbine under the control of said governor but engageable under the force of said speeder spring during a substantial increase in the speed setting of said governor to limit the fuel-increasing movement of said stem and allow the force of said speeder spring to move said sleeve away from said shoulder against the force of said second spring whereby the extent of opening of said valve under the control of the pressure sensor is substantially unaffected by the continuing centifugal force developed by said flyweight.

2. For regulating the flow of fuel to a gas turbine, the combination of, a ball-head rotatable with the turbine shaft, a valve having a part movable back and forth relative to said ball-head to increase and decrease the fuel flow to the turbine, an abutment on said part facing in the direction of the fuel-increasing movement thereof, a second abutment movable relative to said valve part into and out of engagement with said first abutment, a flyweight fulcrumed on said ball-head and engaging said second abutment to move the valve part in the fuel-decreasing direction with increases in the turbine speed when said abutments are engaged, a speeder spring urging said second abutment in the fuel-increasing direction and normally balancing the force of said flyweight, a second spring exerting a force substantially less than said speeder spring and acting between said valve part and said second abutment to urge the latter toward said first abutment, manually operable means for adjusting the stressing of said speeder spring whereby to vary the setting of the all-speed governor formed by said valve, said ball-head, flyweight and the speeder spring and thereby position said valve part in accordance with the radial position of said flyweight, means for sensing changes in the compressor discharge pressure in said turbine including an element movable back and forth with increases and decreases in such pressure, opposed stop members spaced apart during steady-state operation of the turbine under the control of said governor but engageable under the force of said speeder spring during a substantial increase in the speed setting of said governor to limit the fuel-increasing movement of said valve part and allow the force of said speeder spring to move said second abutment away from the first abutment against the force of said second spring whereby the extent of opening of said valve is substantially unaffected by the contiuing centrifugal force developed by said flyweight.

3. A gas turbine fuel control as defined in claim 2 including a stop for positively limiting the separation of said abutment and the increased stressing of said second spring as an incident to an increase in the speed setting of said governor.

4. A gas turbine control as defined by claim 2 in which the movements of said pressure sensing means during engagement of said stop members are transmitted to said valve part through an elongated lever extending transversely of and pivotally connected to a stem extending along the axis of said ball-head.

5. A gas turbine control as defined by claim 4 in which said speeder spring comprises a coil surrounding and disposed intermediate the ends of said stem.

References Cited by the Examiner
UNITED STATES PATENTS

| | | | |
|---|---|---|---|
| 2,129,499 | 9/38 | Landon | 251—285 X |
| 2,633,830 | 4/53 | McCourty. | |
| 2,811,830 | 11/57 | Gartner | 60—39.28 X |
| 2,864,392 | 12/58 | Zeisloft | 60—39.28 X |
| 2,908,477 | 10/59 | Buri | 251—285 X |
| 3,006,143 | 10/61 | Cowles | 60—39.28 |
| 3,019,602 | 2/62 | Plummer | 137—34 |
| 3,067,580 | 12/62 | Kast | 60—39.28 |
| 3,092,966 | 6/63 | Kuzmitz | 60—39.28 |

SAMUEL LEVINE, *Primary Examiner.*